(12) United States Patent
Wang et al.

(10) Patent No.: US 8,515,567 B2
(45) Date of Patent: Aug. 20, 2013

(54) ENHANCED STATE ESTIMATION BASED UPON INFORMATION CREDIBILITY

(75) Inventors: Jin Wang, Austin, TX (US); Qinghua He, Austin, TX (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 701 days.

(21) Appl. No.: 11/313,594

(22) Filed: Dec. 21, 2005

(65) Prior Publication Data

US 2007/0142949 A1   Jun. 21, 2007

(51) Int. Cl.
*G06F 19/00*   (2011.01)

(52) U.S. Cl.
USPC ............................. 700/108; 702/185; 438/16

(58) Field of Classification Search
USPC ............. 700/108, 115, 121; 438/16, 25, 438/26; 702/185
See application file for complete search history.

(56) References Cited

U.S. PATENT DOCUMENTS

| | | | | |
|---|---|---|---|---|
| 6,738,747 | B1* | 5/2004 | Tanaka et al. | 705/9 |
| 6,757,579 | B1* | 6/2004 | Pasadyn | 700/108 |
| 6,834,213 | B1 | 12/2004 | Sonderman et al. | |
| 6,905,895 | B1* | 6/2005 | Coss et al. | 438/16 |
| 7,062,345 | B2* | 6/2006 | Fang et al. | 700/115 |
| 7,062,411 | B2* | 6/2006 | Hopkins et al. | 702/185 |
| 2001/0034563 | A1* | 10/2001 | Matsumoto et al. | 700/101 |
| 2002/0123816 | A1* | 9/2002 | Tanaka et al. | 700/108 |
| 2002/0198964 | A1* | 12/2002 | Fukazawa et al. | 709/219 |
| 2004/0138773 | A1* | 7/2004 | Tomoyasu | 700/108 |
| 2005/0097119 | A1* | 5/2005 | Bayoumi et al. | 707/102 |
| 2006/0031840 | A1* | 2/2006 | Yigit et al. | 718/102 |
| 2006/0282189 | A1* | 12/2006 | Akisawa et al. | 700/110 |

FOREIGN PATENT DOCUMENTS

| | | |
|---|---|---|
| DE | 60207588 T2 | 11/2006 |
| WO | 03023538 A3 | 3/2003 |

OTHER PUBLICATIONS

PCT Search Report for International Application No. PCT/US2006/047604; Jun. 22, 2007.
Translation of Official Communication; German Application No. 11 2006 003 514.2; Jul. 2, 2012.
Moyne, et al.; "A run-to-run control framework for VLSI manufacturing;" SPIE vol. 2091; pp. 379-390.

* cited by examiner

*Primary Examiner* — Mohammad Ali
*Assistant Examiner* — Sheela S Rao
(74) *Attorney, Agent, or Firm* — Williams, Morgan & Amerson, P.C.

(57) ABSTRACT

A method, apparatus, and a system for performing an adaptive state estimation process for processing semiconductor wafers. A processing of a first workpiece is controlled using a process controller and a processing tool. Manufacturing data relating to the processing of the first workpiece is acquired. Status data relating to the manufacturing data is acquired. The status data includes data relating to the source of the manufacturing data. A state of a process controller or a processing tool is determined based upon the status data and the manufacturing data.

15 Claims, 8 Drawing Sheets

ENHANCED STATE ESTIMATION BASED UPON INFORMATION CREDIBILITY

BACKGROUND OF THE INVENTION

1. Field of the Invention

This invention relates generally to semiconductor manufacturing, and, more particularly, to a method and apparatus for performing an adaptive state estimation process based upon manufacturing data to reduce process variation.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a specific manufacturing process.

Figure 1:
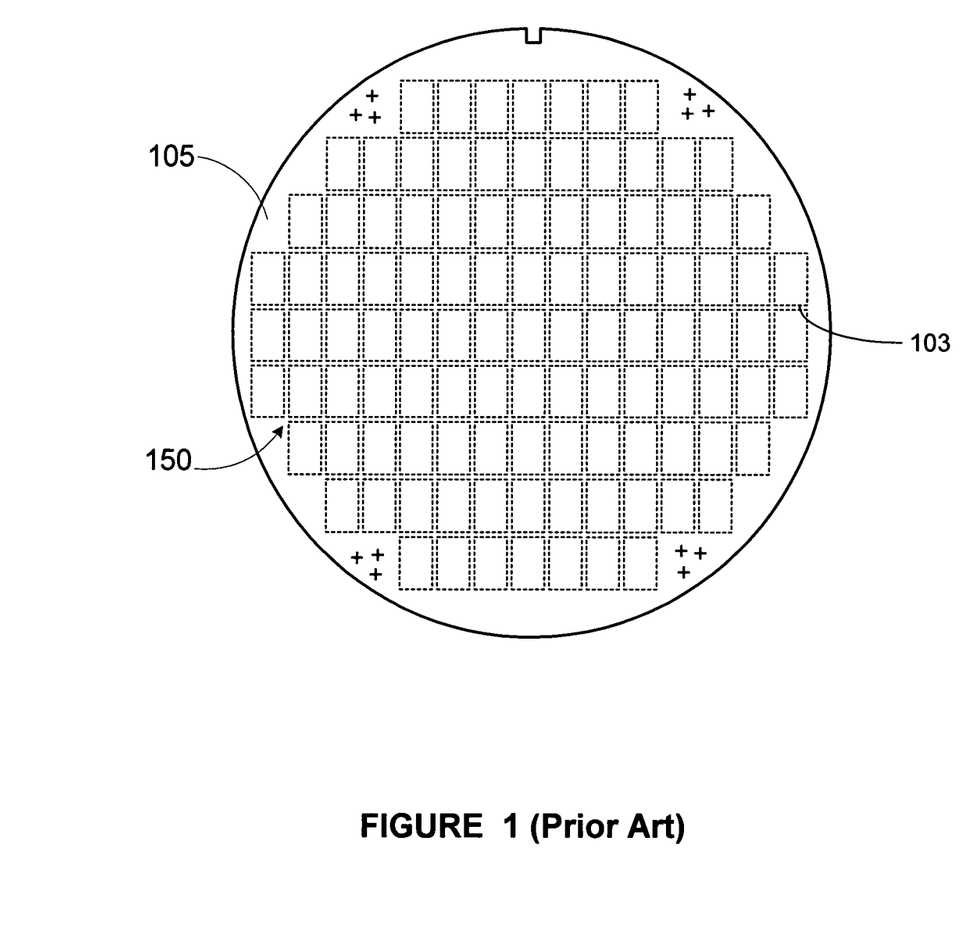
FIG. 1 illustrates a stylized depiction of a semiconductor wafer that may be processed by a semiconductor manufacturing system.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on single or multiple die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

State-of-the-art processing systems utilize a state estimation function in order to determine process control parameters. State estimation functions may include an evaluation of the performance of a controller that controls a process function. Generally, state estimation functions are performed upon processing wafers and acquiring metrology data relating to the processed wafers.

Figure 2:
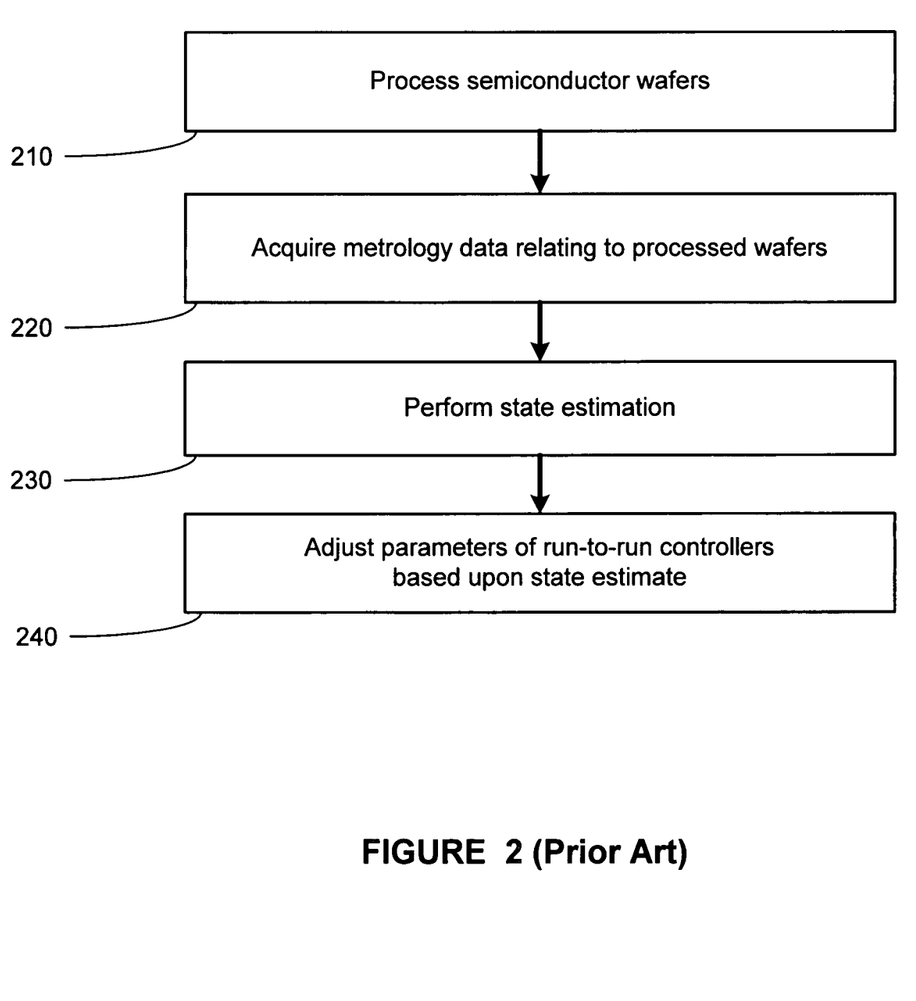
FIG. 2 illustrates a flowchart depiction of a prior art method for processing semiconductor wafers.

Turning now to FIG. 2, a flowchart depiction of a prior art process flow is illustrated. A manufacturing system may process a batch of semiconductor wafers (block 210). Upon processing the wafers, metrology data related to at least some of the processed wafers may be acquired (block 220). Based upon the metrology data, a state estimation function may be performed by the manufacturing system (block 230). The state estimation function may relate to an evaluation of the performance of the controller related to the manufacturing system. Based upon the estate estimation process, the manufacturing system may adjust various parameters of the controller (e.g., a run-to-run controller) for controlling the process operation of subsequent semiconductor wafers (block 240).

One problem associated with the state-of-the-art methodology includes the fact that generally, different sets of metrology data are processed and treated in the same manner even though they may have different characteristics. An example of a state estimator may be an EWMA estimator. The state-of-the-art generally uses the EWMA estimator in such a manner that substantially equal weight is applied to all incoming data that is used to determine the current state estimate of a process system. Generally, state-of-the-art state estimation functions provide a state estimation based upon substantially equal weight applied to the metrology data regardless of any special properties associated with a particular set of metrology data. This may lead to an erroneous assessment of the operation of the controller.

In the state-of-the-art, the underlying information associated with a particular group of metrology data sets may be considered. Therefore, metrology data that is substantially more representative of actual conditions may not be adequately represented in the group of data sets that may be used to perform a state estimation. For example, the goodness-of-fit value associated with the metrology data that is above a predetermined threshold may be all treated equally. For example, if a threshold of 0.7 goodness-of-fit factor value is used as a threshold, the controller may provide equal weight to a goodness-of-fit result of 0.75 as to a goodness-of-fit result of 0.95. These technicalities may cause feedback or feed-forward corrections that are not adequately accurate, thereby, causing further reduction in quality or yield relating to processed semiconductor wafers 105.

The present invention is directed to overcoming, or at least reducing, the effects of one or more of the problems set forth above.

SUMMARY OF THE INVENTION

In one aspect of the present invention, a method is provided for performing an adaptive state estimation process for processing semiconductor wafers. A processing of a first workpiece is controlled using a process controller and a processing tool. Manufacturing data relating to the processing of the first workpiece is acquired. Status data relating to the manufacturing data is acquired. The status data includes data relating to the source of the manufacturing data. A state of a process controller or a processing tool is determined based upon the status data and the manufacturing data.

In another aspect of the present invention, a method is provided for performing an adaptive state estimation process for processing semiconductor wafers. Manufacturing data relating to a process performed upon a workpiece is acquired. Peripheral data relating to the manufacturing data is acquired. The peripheral data comprises a data relating to the source of the manufacturing data, data relating to the age of the manufacturing data, data relating to the goodness-of-fit of the manufacturing data, prediction data correlating to the manufacturing data, data relating to the identification of the tool used to acquire the manufacturing data, data relating to manufacturing data associated with a test wafer, data relating to manufacturing data associated with a production wafer, or data relating to the credibility of the manufacturing data. A state estimation relating to a controller used to process the first workpiece is determined based upon the peripheral data and the manufacturing data.

In yet another aspect of the present invention, a method is provided for performing an adaptive state estimation process for processing semiconductor wafers. Manufacturing data relating to the process performed upon a first workpiece is acquired. Metadata relating to the manufacturing data is acquired. The metadata comprises a data relating to the source of the manufacturing data, data relating to the age of the manufacturing data, data relating to the goodness-of-fit of the manufacturing data, prediction data correlating to the manufacturing data, data relating to the identification of the tool used to acquire the manufacturing data, data relating to manufacturing data associated with a test wafer, data relating to manufacturing data associated with a production wafer, or data relating to the credibility of the manufacturing data. A weight is assigned to the manufacturing data based upon the metadata. At least one state estimation parameter is adjusted based upon the weight of the manufacturing data. A state estimate of a control function used to process the workpiece is performed based upon the state estimation parameter.

In yet another aspect of the present invention, a system is provided for performing an adaptive state estimation process for processing semiconductor wafers. The system of the present invention includes a processing tool to process a workpiece, a measurement tool to acquire manufacturing data relating to processing the workpiece, and a controller operatively coupled to the processing tool and the measurement tool. The controller is adapted to acquire metadata relating to the manufacturing tool, assign a weight to the manufacturing data based upon the metadata, adjust at least one state estimation parameter based upon the weight of the manufacturing data, and perform a state estimate of at least a portion of the system based upon the state estimation parameter.

In another aspect of the present invention, an apparatus is provided for performing an adaptive state estimation process for processing semiconductor wafers. The apparatus of the present invention includes means for controlling a processing of a first workpiece using a process controller and a processing tool; means for acquiring manufacturing data relating to the processing of the first workpiece; means for acquiring status data relating to the manufacturing data, the status data comprising data relating to the source of the manufacturing data; and means for determining a state of at least one of the process controller and the processing tool based upon the status data and the manufacturing data.

In yet another aspect of the present invention, a computer readable program storage device encoded with instructions is provided for performing an adaptive state estimation process for processing semiconductor wafers. The computer readable program storage device is encoded with instructions that, when executed by a computer, performs a method, comprising: controlling a processing of a first workpiece using a process controller and a processing tool; acquiring manufacturing data relating to the processing of the first workpiece; acquiring status data relating to the manufacturing data, the status data comprising data relating to the source of the manufacturing data; and determining a state of at least one of the process controller and the processing tool based upon the status data and the manufacturing data.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, computers, process tools, and systems are schematically depicted in the drawings for purposes of explanation only, and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provides for performing an adaptive state estimation function. The state estimation of a process controller may be performed such that unequal weight may be applied to manufacturing data. The unequal weight may correspond to special properties associated with manufacturing data. For example, metrology data from processed wafers may be treated differently as compared to metrology data relating to a process test wafer, thereby, a source of the data or other information relating to the data may be used to determine a more accurate state of a process controller and perform process control adjustments accordingly.

Figure 3:
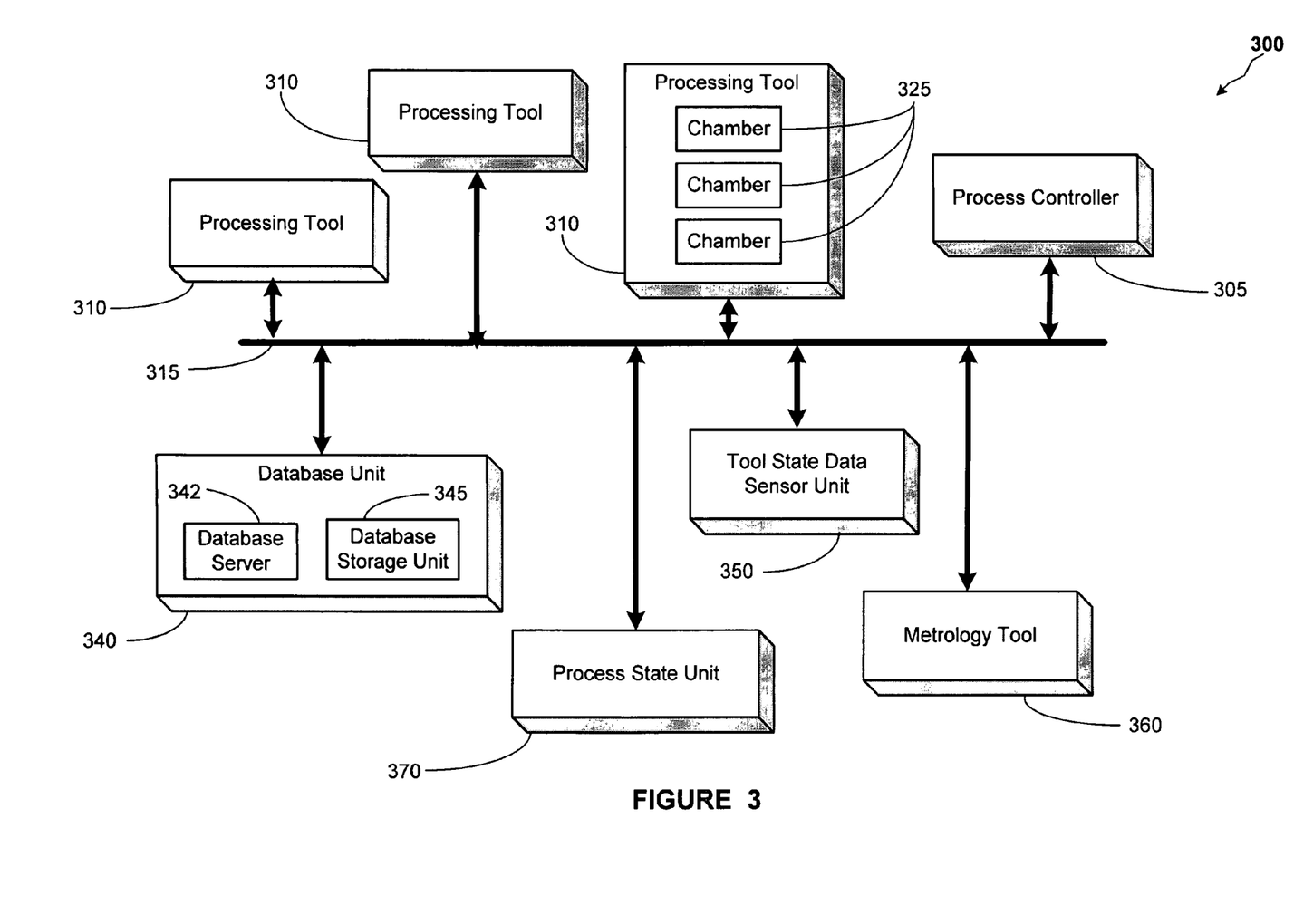
FIG. 3 depicts a block diagram of a system, in accordance with one illustrative embodiment of the present invention.

Turning now to FIG. 3, a system 300 in accordance with embodiments of the present invention is illustrated. A process controller 305 in the system 300 is capable of controlling various operations relating to a plurality of processing tools 310. The processing tools 310 may comprise a plurality of chambers 325, each of which may process wafers. The system 300 is also capable of acquiring continuous value data, such as metrology data related to processed semiconductor wafers 105, performance data, yield data, etc. The system 300 may also comprise a plurality of metrology tools 360 to acquire metrology data related to the processed semiconductor wafers 105.

The system 300 may also comprise a database unit 340. The database unit 340 is provided for storing a plurality of types of data, such as manufacturing-related data, data related to the operation of the system 300 (e.g., the status of the processing tool 310, the status of semiconductor wafers 105, etc.). The database unit 340 may store tool state data relating to a plurality of process runs performed by the processing tool 310. The database unit 340 may comprise a database server 342 for storing tool state data and/or other manufacturing data related to processing of wafers, into a database storage unit 345.

The system 300 may also comprise a tool state data sensor unit 320 for acquiring tool state data. The tool state data may include pressure data, temperature data, humidity data, gas flow data, various electrical data, a level of out-gas data, and other types of data, related to operations of the processing tool 310. Exemplary tool state data for an etch tool may include gas flow, chamber pressure, chamber temperature, voltage, reflected power, backside helium pressure, RF tuning parameters, etc. The tool state data may also include data external to the processing tool 310, such as ambient temperature, humidity, pressure, etc. A more detailed illustration and description of the tool state data sensor unit 320 is provided in FIG. 5 and accompanying description below.

The system 300 also comprises a process state unit the efficacy feedback unit 370, which comprises various components that are capable of performing an adaptive state estimation determination of a process. Data from the process state unit 370 may be used by the process controller 305 to make further adjustments to the operations of the processing tool 310. Data from the database unit 340, as well as data from the metrology tool 360, may be used by the process state unit 370 to perform an adaptive state estimate determining process provided by embodiments of the present invention. Further details of the process state unit, the efficacy feedback unit the efficacy feedback unit 370, is provided in FIG. 5 and accompanying description below.

Utilizing the process state unit 370, the system 300 is capable of performing an adaptive state estimation function. Based upon the adaptive state estimation function, the system 300 is capable of implementing process corrections in a more accurate fashion. The process state unit 370 is capable of adjusting the weighting process of a process estimator, such as a EWMA estimator, based upon peripheral information relating to the actual manufacturing data being analyzed. For example, if metrology data is being analyzed by the process state unit 370, peripheral information relating to the credibility or the source of the metrology data may also be analyzed. For example, a determination may be made as to the source of the metrology data, e.g., whether it is from data relating to a test wafer versus a data relating to a production wafer. Based upon the determination that the metrology data is from a production wafer, further weight may be added to the metrology data to perform the state estimate. This may provide for more accurate assessment of the state of a process controller since the metrology data being analyzed is from a production wafer, which more closely reflects actual production process results as compared to a test wafer.

Other peripheral data or status data relating to the manufacturing data being analyzed may include determining the age of the metrology data, the goodness-of-fit and/or equations used to produce the manufacturing data being analyzed, prediction data that correlates to manufacturing data, etc. This peripheral information relating to the actual data being analyzed may provide an insight to the value of the manufacturing data, which is then used by the process state unit 370 to use as a weighting factor in determining the state estimate. The peripheral data may also comprises metadata, wherein the metadata generally relates to information relating to the manufacturing data.

Various elements of the system 300, such as the process controller 305, the process state unit 370, etc., may be software, hardware, or firmware unit(s) that are standalone units or may be integrated into a computer system associated with the system 300. Furthermore, the various components represented by the blocks illustrated in FIG. 3 may communicate with one another via a system communications line 315. The system communications line 315 may be one or more computer bus links, one or more dedicated hardware communications links, one or more telephone system communications links, one or more wireless communications links, and/or other communication links that may be implemented by those skilled in the art having benefit of the present disclosure.

Figure 4:
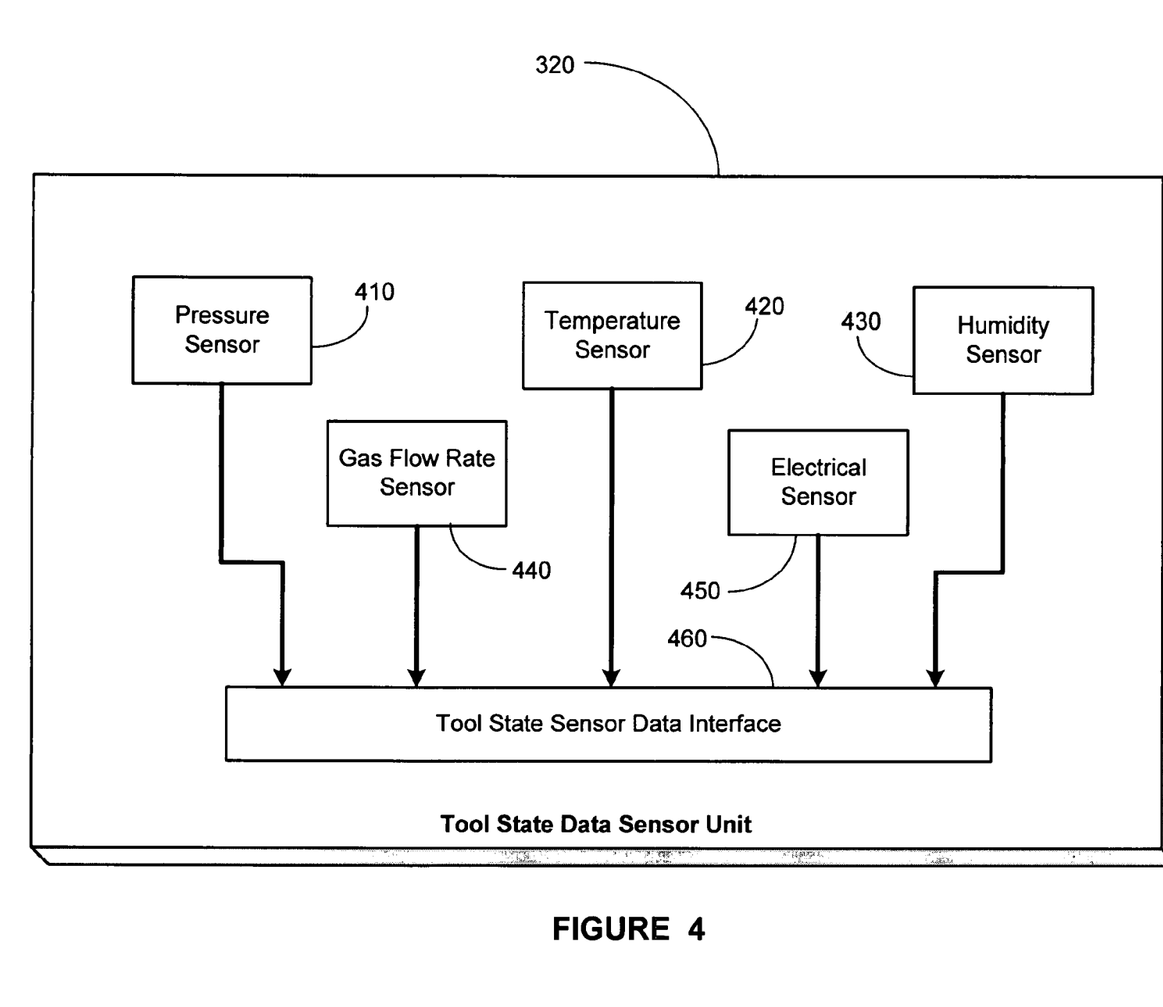
FIG. 4 provides a block diagram depiction of the tool state data unit of FIG. 3, in accordance with one illustrative embodiment of the present invention.

Turning now to FIG. 4, a more detailed block diagram depiction of the tool state data sensor unit 320 illustrated in FIG. 3 is provided. The tool state data sensor unit 320 may comprise any of a variety of different types of sensors, e.g., a pressure sensor 410, a temperature sensor 420, a humidity sensor 430, a gas flow rate sensor 440, and an electrical sensor 450, etc. In an alternative embodiment, the tool state data sensor unit 320 may comprise in situ sensors that are integrated into the processing tool 310. The pressure sensor 10 is capable of detecting the pressure within the processing tool 310. The temperature sensor 420 is capable of sensing the temperature in various locations of the processing tool 310. The humidity sensor 430 is capable of detecting the relative humidity at various portions in the processing tool 310, or of the surrounding ambient conditions. The gas flow rate sensor 440 may comprise a plurality of flow-rate sensors that are capable of detecting the flow-rate of a plurality of process gases utilized during processing of semiconductor wafers 105. For example, the gas flow rate sensor 440 may comprise sensors that can detect the flow rate of gases such as $NH_3$, $SiH_4$, $N_2$, $N_2O$, and/or other process gases.

In one embodiment, the electrical sensor 450 is capable of detecting a plurality of electrical parameters, such as the current provided to a lamp used in a photolithography process. The tool state data sensor unit 320 may also comprise other sensors capable of detecting a variety of manufacturing variables known to those skilled in the art having benefit of the present disclosure. The tool state data sensor unit 320 may also comprise a tool state sensor data interface 460. The tool state sensor data interface 460 may receive sensor data from the various sensors that are contained within, or associated with, the processing tool 310, and/or the tool state data sensor unit 320 and transmit the data to the process controller 305.

Figure 5:
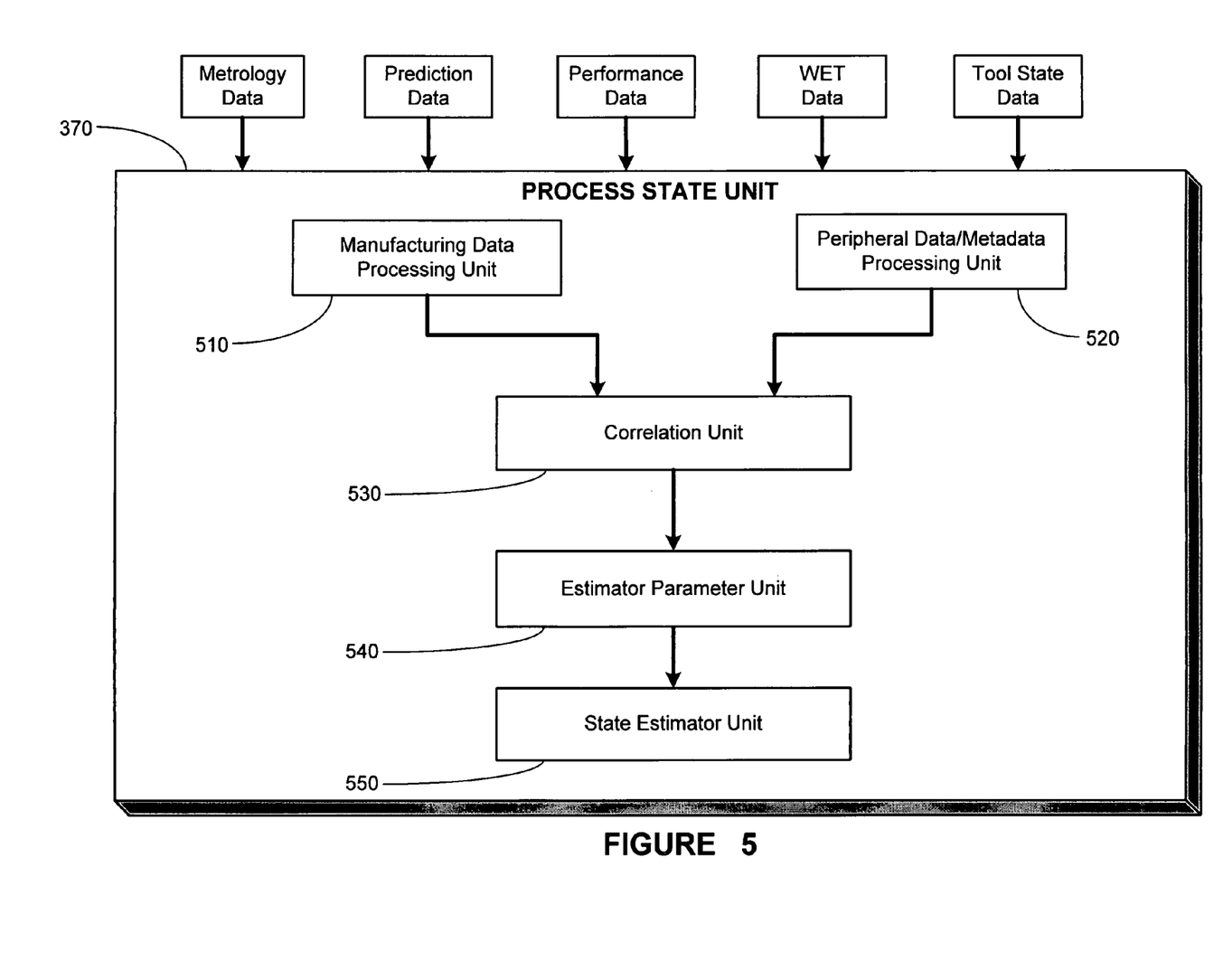
FIG. 5 illustrates a more detailed description of the process data unit of FIG. 3, in accordance with one illustrative embodiment of the present invention.

Turning now to FIG. 5, a more detailed block diagram depiction of the process state unit 370 of FIG. 3, in accordance with one illustrated embodiment of the present invention, is depicted. The process state unit 370 may receive manufacturing data relating to processing wafers. The manufacturing data may include, but is not limited to, metrology data, tool state data, performance data, relating to performance of circuitry of process wafers, wafer electrical test (WET) data, prediction data, etc.

The process state unit 370 may comprise a manufacturing data processing unit 510. The manufacturing data processing unit 510 is capable of processing and organizing the various manufacturing data received by the process state unit 370. The process state unit 370 may also comprise a peripheral data unit 520. The peripheral data unit 520 is capable of deciphering various peripheral or associated data relating to the particular manufacturing data that is received by the process state unit 370. For example, the metrology data that is received may also include the source of the metrology data and/or other context-definition data. For example, this peripheral data may include information regarding whether the metrology data relates to a test wafer or to a production wafer.

Other types of peripheral data may also be received by the process state unit 370. For example, the tool state data may be accompanied by information relating to the particular tool or a particular chamber within the processing tool 310 that relates to the tool state data. For example, the peripheral data unit 270 may indicate that the tool state data may relate to a high volume production processing tool 310, where a large number of wafers are processed. This information regarding the relatively higher credibility of the tool state data may be used to assign greater weight to the tool state data when determining a state estimate. In one embodiment, the peripheral data may be a portion of the manufacturing data stream. However, in an alternative embodiment, the peripheral data may be received separately by the process state unit 370.

The manufacturing data processing unit 510 and the peripheral data unit 520 may provide data to a correlation unit 530. The correlation unit 530 is capable of correlating, stacking, and/or organizing the various manufacturing data and the related peripheral data for further analysis. Therefore, peripheral data relating to the source of the metrology data may be correlated to the actual metrology data before being used for state estimate analysis.

The process state unit 370 may also comprise a estimator parameter unit 540. The estimator parameter unit 540 may receive the correlated manufacturing/peripheral data. The estimator parameter unit 540 is capable of assessing and/or calculating any changes that may be made to a parameter(s) that may be used to perform the state estimation function. Based upon the adjustments to the state estimator parameters, the state estimator unit 550 is capable of executing various algorithms and performing various calculations to determine the state estimate relating a processing function.

An example of the state estimator unit may be a EWMA estimator. The process state unit 370 is capable of modifying the weight of particular parameters based on the credibility and/or the peripheral characteristics of the manufacturing data being analyzed. Therefore, even if the accuracy of the metrology data, for example, is regarded as being high, if the peripheral data indicates that the metrology data source is not as credible since it is based on a test wafer, the weight attached to the parameter that accounts for the metrology data is reduced in an adaptive manner when performing the state estimation process. The peripheral data may include various information, such as the source of the data, the type of wafer from which it is acquired, the age of the data, the goodness-of-fit related to the data, the prediction of a final product based on the current state of a semiconductor wafer, etc. The age of the data may be determined by comparing the age of the data to a predetermined time period to determine whether the age of the data exceeds a threshold. Based upon the peripheral data, and its credibility, an adaptive state estimation process is performed to determine the estimated state of a process.

Figure 6:
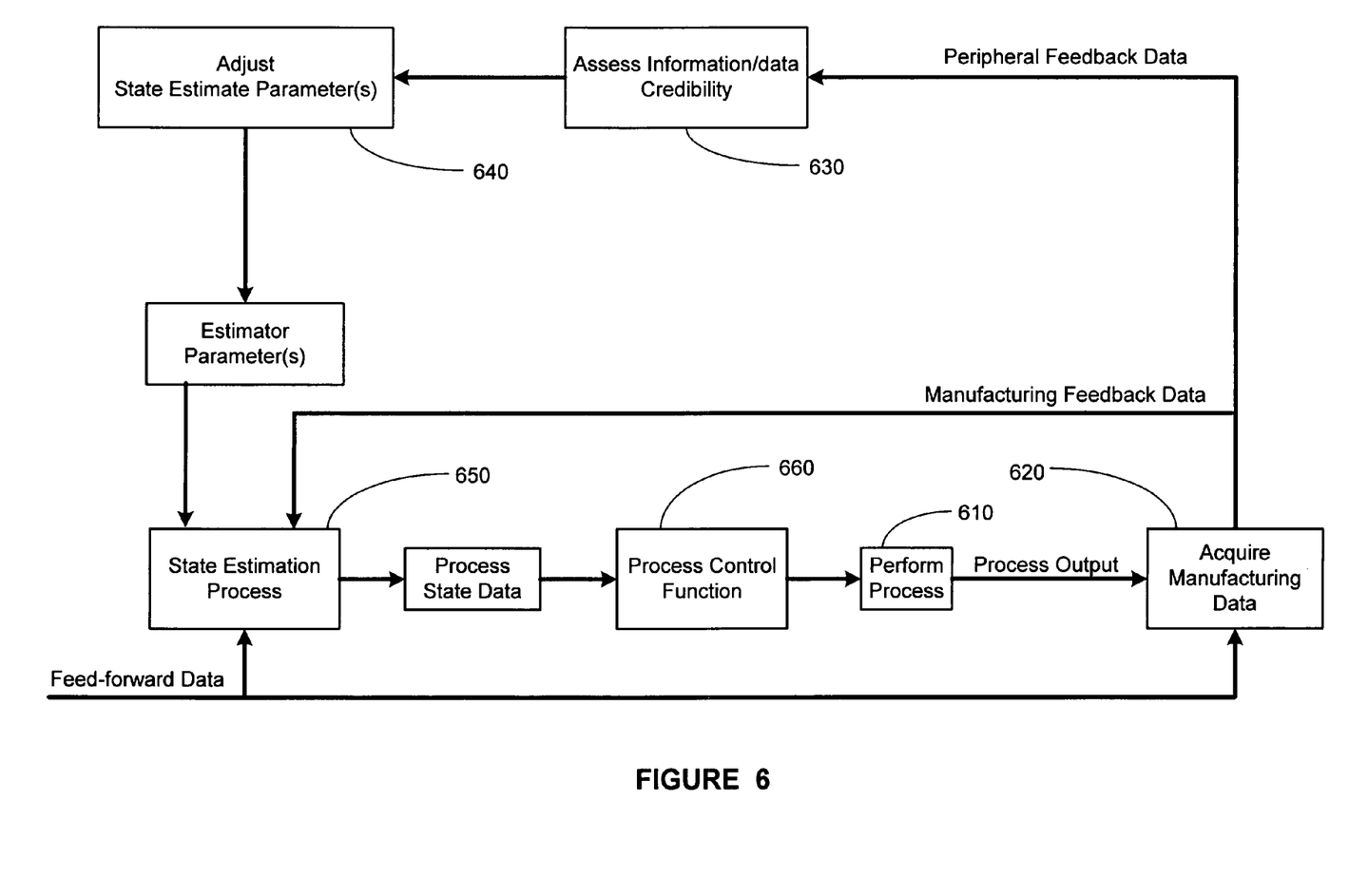
FIG. 6 illustrates a block diagram depiction of a process flow for performing a process control function, in accordance with one illustrative embodiment of the present invention.

Turning now to FIG. 6, a flowchart depiction of a process flow for performing an adaptive state estimation process in accordance with an illustrative embodiment of the present invention is provided. One or more semiconductor wafers may be processed by the system 300 (block 610). Upon performing the processes, manufacturing data relating to the process may be acquired (block 620). Manufacturing data may include various types of data, such as metrology data relating to a portion or all of the process output, tool state data, performance of the wafers, wafer electrical test, prediction of the performance of the process wafer, etc. Upon acquiring the manufacturing data, feedback data may be used to assess peripheral data (i.e., the information credibility) of the manufacturing data. This may include various aspects of the circumstances in which the manufacturing data was acquired, such as the particular tool and the history of the tool that relates to tool state data, the type of wafer from which metrology data was acquired, the prediction of the process wafers performance, the delay in acquiring the manufacturing data, etc.

Upon assessment of the information credibility, the system 300 may perform an adjustment of one or more estimator parameter(s) (block 640). The modified estimator parameters may then be used to perform a state estimation process (block 650). The state estimation process may utilize the modified estimator parameters, as well as the manufacturing data itself, to perform a state estimation process. Additionally, the state estimation process may include analyzing feed-forward data from previous process operations.

Using the modified estimator parameter(s), the state estimation process may effectively adjust the weight of the manufacturing data that is sent to the state estimation process. Based upon this weighting, an adaptive adjustment to the state estimation may be performed based on the circumstances and/or the context of the manufacturing data. One example of the adaptive adjustments of the estimated parameters to perform the state estimation process may include determining whether a deposition thickness in a deposition process was performed on a test wafer or on a production wafer. The deposition thickness measured on the production wafer may carry more information and thus, it should be weighed more heavily, as compared to the data from the test wafer. Therefore, when the state estimator updates the deposition rate for production wafers, the topology of the production wafer affects the deposition rate more heavily as compared to the test wafer, which may include lower amount of topology. Therefore, a more accurate process adjustment may be made based on the adaptive state estimation process provided by embodiments of the present invention.

Another example of the adaptive state estimation process may include an analysis of a wafer as a result of a chemical-mechanical polishing process (CMP). The tool bare wafer removal rate (BWRR) may be affected by a particular wafer pattern which may eventually affect the final film thickness. Therefore, the BWRR is generally calibrated to ensure accurate correction of film thickness deposition processes. Utilizing Qual run wafers to acquire data and then utilizing the pattern effect obtained from a next production run, provides for weighting an EMWA factor even higher, which may provide faster update and conversions of the state estimates. When further wafers are processed, the information of the pattern effect may become less reliable. As a result, the adaptive state estimation process may adjust the weighting used for the state estimate (e.g., the EMWA weighting) by scaling it back to a lower level to avoid estimation deviation from the true value. Therefore, without the need for running a look-ahead wafer, control performance of the CMP process may be improved utilizing the adaptive state estimation function provided by embodiments of the present invention. The EMWA (exponentially weighted moving average) may relate to a statistic for monitoring the process that averages the data in a manner that provides progressively less weight to data as they are further removed in time.

As another example, the feedback block diagram illustrated in FIG. 6 may refer to adjusting estimated parameters based on a delay in acquiring the metrology data. For example, if the metrology data is acquired after a significant or excessive amount of delay after processing, the weighting of the estimator parameter(s) relating to the metrology data may be reduced based on the age of the metrology data. Therefore, the effects of excessive stale metrology data may be reduced. This may provide for more accurate feedback of feed-forward adjustments to processes based upon the adaptive state estimate process.

In yet another example, metrology data with a significantly different goodness-of-fit may be handled differently and the state estimate may be weighed adaptively based on the goodness-of-fit. For example, metrology data may include two parts: the actual metrology value and the goodness-of-fit calculation relating to the metrology value. Goodness-of-fit may include information relating to the reliability of the measurement. The state estimator parameter may be adjusted based on the value of the goodness-of-fit associated with particular manufacturing data. For example, during the assessment of the information credibility of block 630, manufacturing data may indicate that the goodness-of-fit has a value of 0.95. The adjustment of the estimator parameter processing block 640 may provide for increasing the weighting of the manufacturing data associated with the goodness-of-fit. However, if the goodness-of-fit is determined to be 0.75, the estimator parameter may be adjusted to reduce the weight of such data.

Another example of performing the adaptive state estimation process may include analyzing a prediction error when performing a state assessment analysis using a particular manufacturing data. For example, if a first measurement process providing metrology data significantly drifts away from its initially predicted value, the state estimator may be adjusted to a lower weighting of such data, thereby increasing the accuracy of the state estimation process (block 650). Therefore, various types of peripheral data may be analyzed to assess the credibility to be attached to a particular set of manufacturing data. Utilizing the weighting scheme, a more accurate adjustment to the process associated with the system 300 may be performed.

Figure 7:
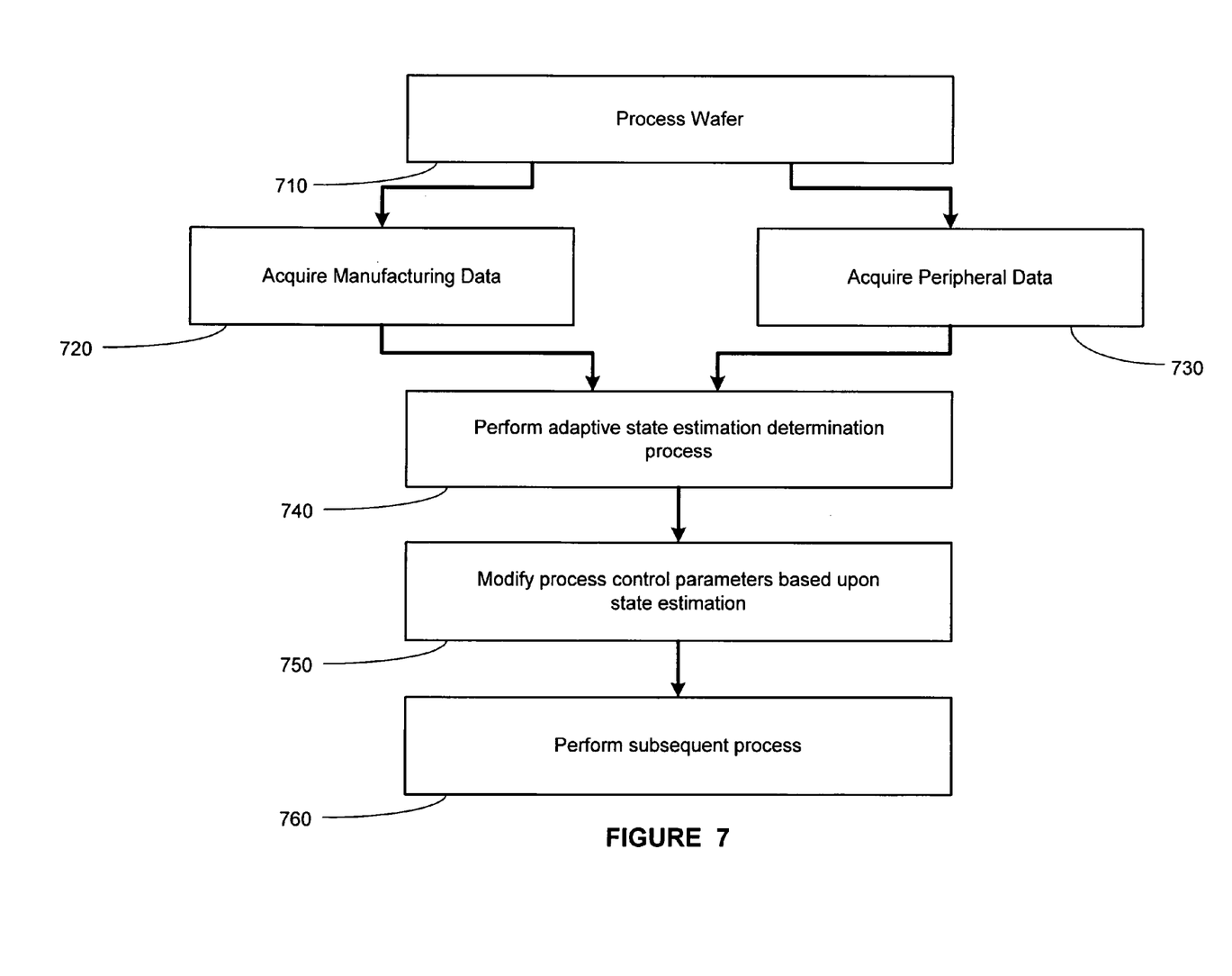
FIG. 7 illustrates a flowchart depiction of the method in accordance with one illustrative embodiment of the present invention.

Turning now to FIG. 7, a flowchart depiction of the method in accordance with one illustrative embodiment of the present invention, is provided. The system 300 may process a set of semiconductor wafers from a wafer-batch or a lot (block 710). Upon processing the wafer, the system 300 may acquire manufacturing data (block 720). Upon acquiring manufacturing data, peripheral data (block 730) may also be acquired. The acquisition of the peripheral data may be received as an integrated part of the manufacturing data or may be separately received.

Upon acquisition of peripheral data and the related manufacturing data, the system 300 may perform an adaptive state estimation determination process (block 740). A more detailed description of the adaptive state estimation determination process is provided in FIG. 8 and accompanying description below. Upon performing the adaptive state estimation determination process, a process state estimation that is weighted based on the context of the manufacturing data is provided by the system 300. Based upon the newly adapted calculated process parameters, various process control parameters may be determined based on state estimate (block 750). Upon modifying the process control parameters, a subsequent wafer or subsequent processes on the previously processed wafers, may then be performed (block 760).

Figure 8:
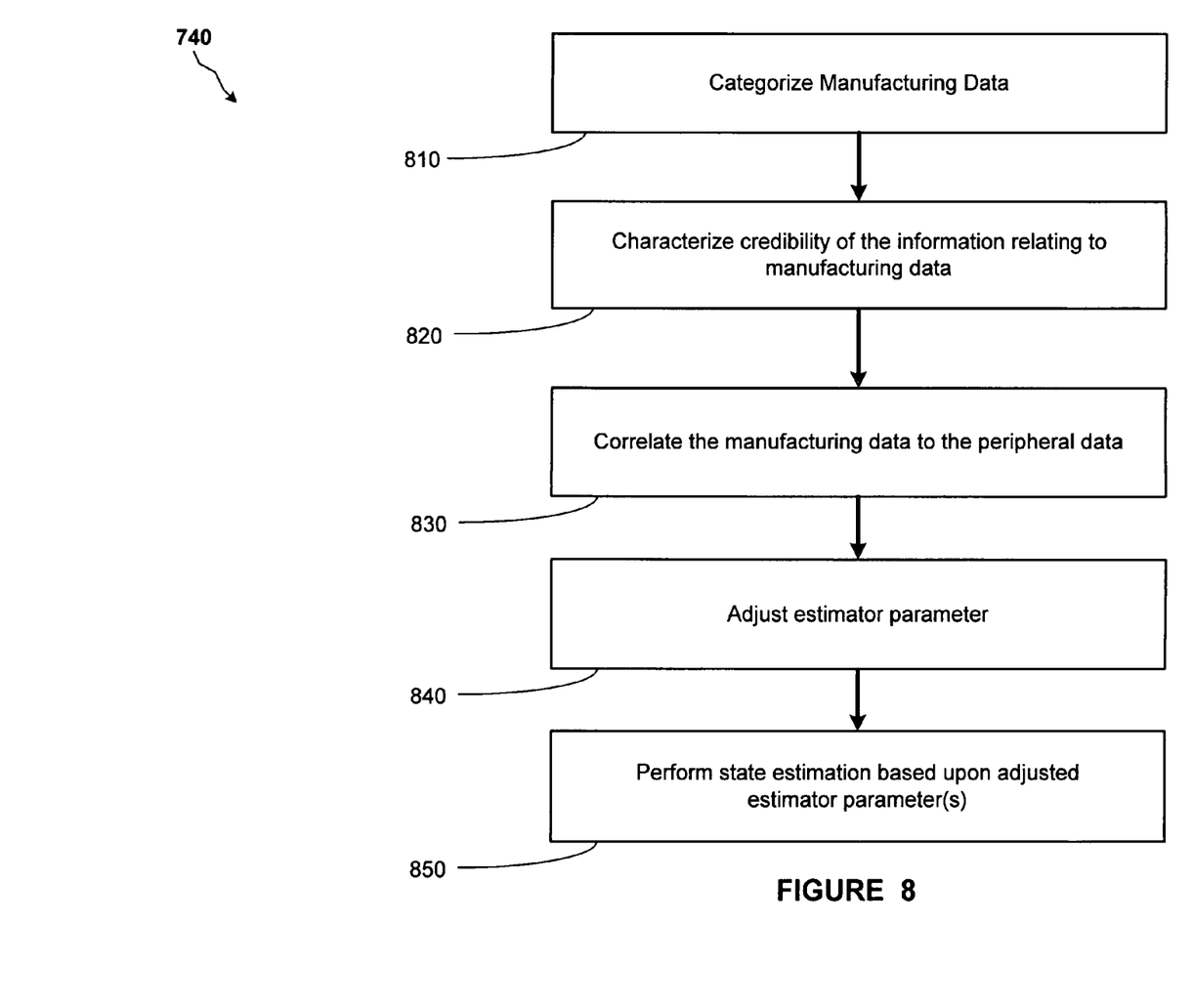
FIG. 8 illustrates a more detailed flow chart depiction of the steps for performing an adaptive state estimation determination process.

Turning now to FIG. 8, a block diagram depiction of the steps for performing the adaptive estimation determination process of block 740 of FIG. 7, is illustrated. The system 300, upon acquisition of manufacturing data and related peripheral data, may characterize the manufacturing data based on the peripheral data (block 810). Upon characterizing the manufacturing data, the system 300 may characterize the credibility of the information relating to the data (block 820). For example, the source of the test wafer may be weighed or valued less than the actual manufacturing wafer data. This may include determining whether the source was a test wafer or a production wafer, which may affect the credibility of the metrology data.

The system 300 may also perform a correlation function relating to the manufacturing data and the peripheral data. The correlation may then be used to adjust the estimator parameter (block 840). Determining the estimator parameter adjustment includes using the correlated peripheral data, the actual process data, which may include providing greater weighting of the manufacturing data. Upon adjustments of the state estimator parameters, the system 300 may perform the state estimation on the adjusted estimated parameters. Based on the adjusted estimated parameters, a more accurate state estimation determination is performed using the adjusted estimator parameters (block 850). This may include performing feedback corrections of the process or performing feed-forward adjustments to subsequent processes.

Utilizing embodiments of the present invention state estimation processes are enhanced by performing an adaptive adjustment to various parameters of the state estimate. Utilizing external data or peripheral data related to actual manufacturing data, the manufacturing data is placed into a proper context, which may be used to adaptively adjust the parameters for performing the state estimation. Based upon the adaptive adjustments of the parameters for performing a state estimation, further accuracy of the data retrieved and related circumstance is promoted. Therefore, a more robust and accurate adjustments of processes or process control adjustments may be performed utilizing embodiments of the present invention.

The principles taught by the present invention can be implemented in an Advanced Process Control (APC) Framework. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed:

1. A method, comprising:
controlling a processing of a first workpiece using a process controller and a processing tool;
acquiring manufacturing data relating to said processing of the first workpiece;
acquiring status data relating to said manufacturing data, said status data comprising data identifying a source of said manufacturing data, the source being at least one of:
a type of workpiece being processed comprising at least one of a test workpiece or a production workpiece; or
a type of tool being used in the processing; and
determining a state of at least one of said process controller and said processing tool based upon said status data and said manufacturing data, wherein determining said state of at least one of said process controller and said processing tool comprises performing a state estimation function.

2. The method of claim 1, further comprising adjusting a control parameter for processing a second workpiece based upon said state.

3. The method of claim 1, wherein acquiring said manufacturing data comprises acquiring at least one of a metrology data, a tool state data, a performance prediction data, a performance data, and a wafer electrical test data; and
wherein the type of tool being used in the processing comprises at least one of a processing tool that processes a high-volume of workpieces or a processing tool that processes a low-volume of workpieces.

4. The method of claim 1, wherein acquiring status data relating to said manufacturing data further comprising at least one of an age of said manufacturing data, the goodness-of-fit of said manufacturing data, or prediction data correlating to the manufacturing data.

5. The method of claim 1, wherein performing a state estimation function comprises assigning a weight to said manufacturing data based upon said status data.

6. The method of claim 5, further comprising adjusting a state estimation function parameter based upon said weight assigned to said manufacturing data.

7. The method of claim 6, wherein assigning a weight to said manufacturing data based upon said status data comprises assigning a first weight to said manufacturing data based upon an indication that a source of said manufacturing data is a test wafer and assigning a second weight to said manufacturing data based upon an indication that a source of said manufacturing data is a production wafer.

8. The method of claim 6, wherein assigning a weight to said manufacturing data based upon said status data further comprises assigning a first weight to said manufacturing data based upon an indication that the age of said manufacturing data is below a threshold time period and assigning a second weight to said manufacturing data based upon an indication that the age of said manufacturing data is above a threshold time period.

9. The method of claim 6, wherein assigning a weight to said manufacturing data based upon said status data further comprises assigning a first weight to said manufacturing data based upon an indication that the goodness-of-fit of said manufacturing data is within a first range of predetermined values and assigning a second weight to said manufacturing data based upon an indication that the goodness-of-fit of said manufacturing data is within a second range of predetermined values.

10. A computer readable program storage device encoded with instructions that, when executed by a computer, performs a method, comprising:
controlling a processing of a first workpiece using a process controller and a processing tool;
acquiring manufacturing data relating to said processing of the first workpiece;
acquiring status data relating to said manufacturing data, said status data comprising data identifying the source of said manufacturing data, the source being at least one of:
a type of workpiece being processed comprising at least one of a test workpiece or a production workpiece; or
a type of tool being used in the processing; and
determining a state of at least one of said process controller and said processing tool based upon said status data and said manufacturing data, wherein determining said state of at least one of said process controller and said processing tool comprises performing a state estimation function.

11. The computer readable program storage device encoded with instructions that, when executed by a computer, performs the method of claim 10, wherein performing a state estimation function comprises assigning a weight to said manufacturing data based upon said status data.

12. The computer readable program storage device encoded with instructions that, when executed by a computer, performs the method of claim 11, further comprising adjusting a state estimation function parameter based upon said weight assigned to said manufacturing data.

13. The computer readable program storage device encoded with instructions that, when executed by a computer, performs the method of claim 12, wherein assigning a weight to said manufacturing data based upon said status data comprises assigning a first weight to said manufacturing data based upon an indication that a source of said manufacturing data is a test wafer and assigning a second weight to said manufacturing data based upon an indication that a source of said manufacturing data is a production wafer.

14. The computer readable program storage device encoded with instructions that, when executed by a computer, performs the method of claim 12, wherein assigning a weight to said manufacturing data based upon said status data comprises assigning a first weight to said manufacturing data based upon an indication that the age of said manufacturing data is below a threshold time period and assigning a second weight to said manufacturing data based upon an indication that the age of said manufacturing data is above a threshold time period.

15. The computer readable program storage device encoded with instructions that, when executed by a computer, performs the method of claim 12, wherein assigning a weight to said manufacturing data based upon said status data comprises assigning a first weight to said manufacturing data based upon an indication that the goodness-of-fit of said manufacturing data is within a first range of predetermined values and assigning a second weight to said manufacturing data based upon an indication that the goodness-of-fit of said manufacturing data is within a second range of predetermined values.

* * * * *